United States Patent [19]
Kern et al.

[11] Patent Number: 5,537,025
[45] Date of Patent: Jul. 16, 1996

[54] BATTERY CHARGER/PRE-EXCITER FOR ENGINE-DRIVEN GENERATOR

[75] Inventors: Robert D. Kern, Waukesha; Gerald C. Ruehlow, Oconomowoc, both of Wis.; Graham W. McLean, Lymm, England; Frank Wedel, Lake Mills, Wis.

[73] Assignee: Generac Corporation, Waukesha, Wis.

[21] Appl. No.: 108,992

[22] Filed: Aug. 18, 1993

[51] Int. Cl.⁶ .................................................. H02P 9/14
[52] U.S. Cl. ............................................ 322/46; 310/181
[58] Field of Search ............................ 322/29, 46, 86; 310/181

[56] References Cited

U.S. PATENT DOCUMENTS

| | | | |
|---|---|---|---|
| 3,863,137 | 1/1975 | Mishima et al. | 322/25 |
| 4,146,831 | 3/1979 | Farr | 322/94 |
| 4,217,538 | 8/1980 | Ziemacki | 322/29 |
| 4,467,267 | 8/1984 | Hucker et al. | 322/61 |
| 4,701,692 | 10/1987 | Takeuchi et al. | 322/90 |
| 4,772,802 | 9/1988 | Glennon et al. | 290/31 |
| 4,841,216 | 7/1989 | Okada et al. | 322/10 |
| 5,397,975 | 3/1995 | Syverson | 322/46 |

*Primary Examiner*—Steven L. Stephan
*Assistant Examiner*—Nicholas Ponomarenko
*Attorney, Agent, or Firm*—Reinhart, Boerner, Van Deuren, Norris & Rieselbach

[57] ABSTRACT

An engine-driven generator having a battery powered starter motor includes a permanent magnet battery charger/pre-exciter for charging the starting battery and for exciting the main alternator field winding of an AC synchronous alternator included in the engine-driven generator. A first winding in the permanent magnet battery charger/pre-exciter provides power to a first voltage regulator that, in turn, maintains a desired load voltage substantially independently of alternator loading. A second winding within the permanent magnet battery charger/pre-exciter supplies power to a second voltage regulator that maintains a desired battery charging voltage substantially independently of the alternator loading. Use of the permanent magnet battery charger/pre-exciter maintains a desired battery charge current and a desired main alternator field excitation substantially independently of the load current supplied by the alternator.

14 Claims, 1 Drawing Sheet

BATTERY CHARGER/PRE-EXCITER FOR ENGINE-DRIVEN GENERATOR

BACKGROUND OF THE INVENTION

This invention relates generally to engine-driven generators and, more particularly, to alternating current (AC) synchronous alternators including structure for charging an engine starting battery.

Although small engine-driven electrical generators can be, and typically are hand started, larger units are typically started by means of a battery-powered starter motor. The starter battery is kept charged with a charging current developed by the generator as the generator operates.

In one common arrangement, a separate, dedicated alternator was included with the generator and was used to charge the starting battery. Although effective, the use of a separate alternator for battery charging was expensive and contributed to the size and weight of the generator.

In another arrangement, battery charging current was supplied from the main alternator windings of an AC synchronous alternator. Although generally effective, the battery charge voltage and, hence, the battery charge current, varied according to the load on the main alternator winding. Over or under charging could be the result.

SUMMARY OF THE INVENTION

The invention provides an engine-driven generator including an engine, a battery for starting the engine and an alternator coupled to the engine. The alternator includes a main exciter field winding, and the engine-driven generator further includes a permanent magnet battery charger/pre-exciter coupled to the engine. The permanent magnet battery charger/pre-exciter includes a pre-exciter winding and a battery charge winding. A voltage regulator, coupled to the pre-exciter winding and to the main exciter field winding, maintains a desired voltage across the main winding substantially independently of the load current supplied by the engine-driven generator. An additional voltage regulator coupled to the battery charge winding and the battery maintains a desired charging voltage across the battery substantially independently of the load current supplied by the engine-driven generator.

The invention also provides a battery charger/pre-exciter operable to charge a starting battery and to excite an alternator main exciter field winding in an engine-driven generator. The battery charger/pre-exciter includes a permanent magnet and structure for rotating the permanent magnet to provide a changing magnet field. The battery charger/pre-exciter further includes a first winding within the changing magnet field, a first voltage regulator coupled to the first winding and operable to develop a desired voltage for application to the alternator main exciter field winding in response to the voltage induced in the first winding by the changing magnetic field, a second winding within the changing magnetic field and a second voltage regulator coupled to the second winding and operable to develop a desired voltage for application to the starting battery of the engine-driven generator in response to the voltage induced in the second winding by the changing magnetic field.

The invention also provides an alternator including an input shaft, a main alternator field winding co-rotatable with the input shaft, a relatively stationary main alternator output winding in magnetic communication with the main alternator field winding and a relatively stationary main exciter field winding. The alternator further includes a main exciter armature winding co-rotatable with the input shaft in magnetic communication with the main exciter field winding and electrically coupled to the main alternator field winding. The alternator further includes a plurality of permanent magnets co-rotatable with the input shaft for developing a changing magnetic field in response to rotation of the input shaft. The alternator further includes a relatively stationary pre-exciter winding in magnetic communication with the permanent magnets and further includes structure for coupling electrical energy developed in the pre-exciter winding to the main exciter field winding. The alternator also includes a relatively stationary battery charge winding and includes a voltage regulator coupled to the battery charge winding for converting electrical energy induced in the battery charge winding to a desired direct current suitable for charging a battery.

It is an object of the present invention to provide a new and improved engine-driven generator.

It is a further object of the present invention to provide a new and improved engine-driven generator that includes a battery charging system that is compact and economical.

It is still another object of the present invention to provide an engine-driven generator having a battery charging system that avoids undercharging or overcharging conditions over a wide range of generator loads.

It is still another object of the present invention to provide a new and improved engine-driven generator that provides a desired charging current to an engine starting battery substantially independently of the load current supplied by the engine-driven generator.

BRIEF DESCRIPTION OF THE DRAWINGS

The features of the present invention that are believed to be novel are set forth with particularity in the appended claims. The invention, together with the further objects and advantages thereof, may best be understood by reference to the following description taken in conjunction with the accompanying drawings, wherein like reference numerals identify like elements, and wherein:

DESCRIPTION OF THE PREFERRED EMBODIMENT

Figure 1:
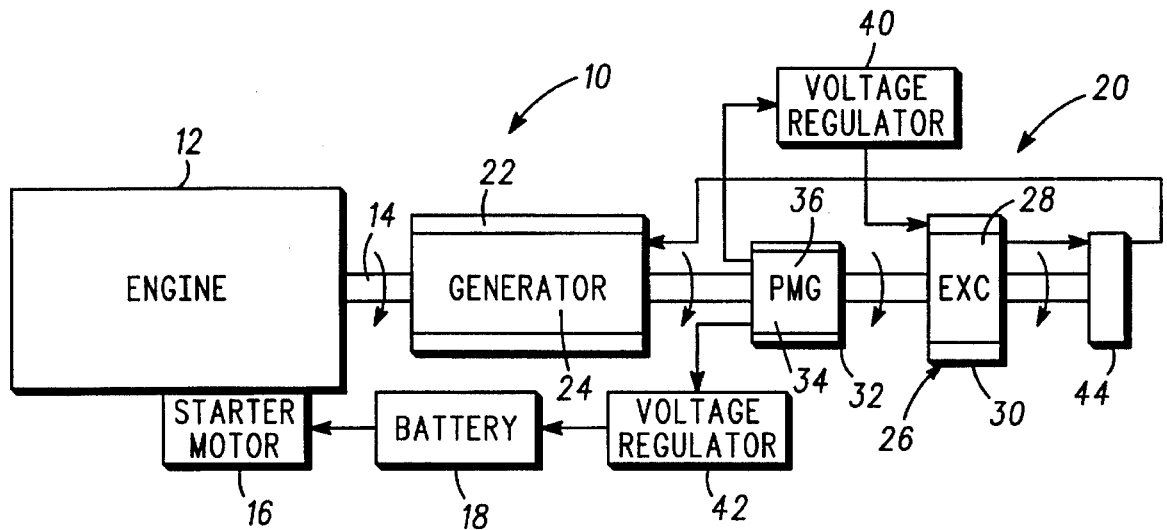
FIG. 1 is a simplified diagrammatic view of an engine-driven generator embodying various features of the invention showing the principal mechanical and electrical sub-elements thereof in block diagram form.

Referring to the drawings and, more particularly, to the simplified block diagram of FIG. 1, an engine-driven generator 10 embodying various features of the invention is shown. As illustrated, the engine-driven generator 10 includes an internal combustion engine 12 that, when it is operating, turns a shaft 14. The internal combustion engine 12 is conventionally started by a starter motor 16 powered by a starter battery 18.

The engine-driven generator 10 further includes an alternating current (AC) synchronous alternator 20 constructed in accordance with various aspects of the invention. The synchronous alternator 20 includes a main alternator output winding 22 that remains relative to the shaft 14 as the engine-driven generator 10 operates. A main alternator field winding 24 which is mounted for co-rotation with the shaft 14, rotates relative to the main alternator output winding 22 in magnetic communication therewith as the engine-driven generator 10 operates. Electrical current induced in the main alternator output winding 22 as the engine-driven generator 10 operates comprises the primary electrical output of the engine-driven generator.

Electrical current for exciting the main alternator field winding 24 is provided by an exciter 26 that is also coupled to the shaft 14. The exciter 26 includes a main exciter armature winding 28 that is coupled to the shaft 14 for co-rotation therewith. A main exciter field winding 30 in magnetic communication with the main exciter armature winding 28 remains relative to the shaft 14 as the shaft 14 rotates during engine operation. Electrical current induced in the main exciter armature winding 28 as the shaft rotates is rectified and supplied to the main alternator field winding 24 to excite the main alternator field winding 24 and develop a magnetic field in the vicinity of the main alternator output winding 22.

Electrical current for exciting the main exciter field winding 24 is provided by means of a permanent magnet pre-exciter/battery charger 32 constructed in accordance with various features of the invention. The pre-exciter/battery charger 32 includes a pair of independent battery charge and pre-exciter windings 34, 36 that remain stationary relative to the shaft 14 as the shaft 14 rotates. A plurality of permanent magnets 38 (FIG. 2) coupled to and mounted for co-rotation with the shaft 14 rotate relative to the battery charge and pre-exciter windings 34, 36 in magnetic communication therewith as the shaft 14 rotates. As the magnets 38 move, electrical currents are induced in both the pre-exciter winding 36 and the battery charge winding 34.

Electrical current induced in the pre-exciter winding 36 is supplied to a first or main voltage regulator 40 of conventional construction that maintains a desired main winding voltage even as the pre-exciter voltage at its input varies over a predetermined range. The output of the main voltage regulator 40 is connected to the main exciter field winding 30 to maintain the desired current in the main exciter field winding 30 despite variations in the voltage induced in the pre-exciter winding 36.

Current induced in the battery charge winding 34 is supplied to the input of a second or battery voltage regulator 42 also of known construction. The battery voltage regulator 42 maintains at its output a desired battery charge voltage even as the voltage applied at its input varies over a predetermined range. Accordingly, the battery voltage regulator 42 serves to maintain the desired battery charge voltage despite variations in the voltage induced in the battery charge winding 34.

Figure 2:
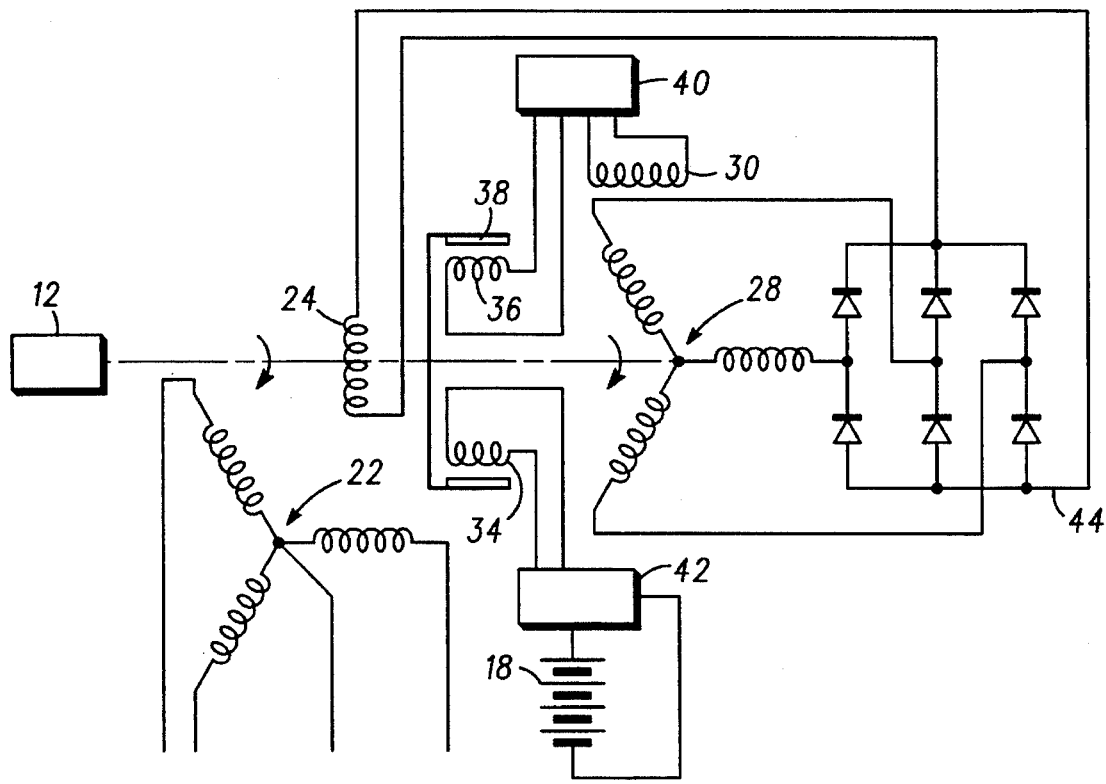
FIG. 2 is a simplified electrical schematic diagram of the engine-driven generator shown in FIG. 1.

In practice, and as illustrated in FIG. 2, the engine-driven generator can be configured for three-phase operation. In this case, both the main alternator output windings 22 and the main exciter armature windings 28 include a separate section for each phase. In addition, a three-phase full wave rectifier 44 is provided at the output of the main exciter armature winding 28.

The first and second voltage regulators 40, 42 are preferably each adjusted for the desired system operation. In particular, the first or main voltage regulator 40 is adjusted to maintain the desired main winding voltage, while the second or battery voltage regulator 42 is adjusted to maintain a desired charge voltage across the battery 18. It will be appreciated by those skilled in the art that the specific current and voltage parameters will be selected in accordance with the characteristics and operating requirements of the particular engine-driven generator.

The engine-driven generator 10, and in particular the permanent magnet pre-exciter/battery charger provide many advantages. The use of permanent magnets ensures the presence of a magnet field around the pre-exciter and battery charge windings regardless of the load current being drawn from the engine-driven generator. Accordingly, both the battery charge current and the main winding voltage 22 are maintained substantially independently of the load current provided by the engine-driven generator. Furthermore, the pre-exciter/battery charger can be integrally formed within the AC synchronous alternator to avoid the need for separate dedicated battery charger.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the spirit and scope of the invention.

We claim:

1. An engine-driven generator comprising:

an engine;

a starter motor coupled to said engine;

a battery for supplying current to said starter motor to start said engine;

an alternator coupled to said engine, said alternator having a main exciter field winding;

a permanent magnet battery charger/pre-exciter coupled to said engine, said permanent magnet battery charger/pre-exciter having a pre-exciter winding and a battery charge winding;

a voltage regulator coupled to said pre-exciter and to said main exciter field winding for maintaining a desired main winding voltage substantially independently of the load current supplied by said engine-driven generator; and an additional voltage regulator coupled to said battery charge winding and said battery for maintaining a desired voltage across said battery substantially independently of the load current supplied by said engine-driven generator.

2. An engine-driven generator as defined in claim 1 wherein said permanent magnet battery charger/pre-exciter includes a permanent magnet coupled to said engine for rotation around said pre-exciter winding and said battery charge winding in response to operation of said engine.

3. An engine-driven generator as defined in claim 2 wherein said permanent magnet battery charger/pre-exciter includes a plurality of said permanent magnets.

4. An engine-driven generator as defined in claim 1 wherein said alternator further includes a main alternator output winding, a main alternator field winding and a main exciter armature magnetically coupled with said main exciter field winding for supplying an electrical current to said main alternator field winding when said voltage regulator maintains said desired load voltage and said engine rotates said main exciter armature winding relative to said main exciter field winding.

5. An engine-driven generator as defined in claim 4 wherein said main alternator output winding and said main exciter field winding are relatively stationary and said main alternator field winding and said main exciter armature winding are relatively non-stationary.

6. A battery charger/pre-exciter for an engine-driven generator of the type having a starting battery, an alternator and an alternator main exciter field winding in the alternator, said battery charger/pre-exciter being operable to charge the starting battery and to excite the alternator main exciter field winding in the engine-driven generator, said battery charger/pre-exciter comprising:

a permanent magnet;

means for rotating said permanent magnet to provide a changing magnetic field;

a first winding within said changing magnetic field;

a first voltage regulator coupled to said first winding and operable to develop a desired voltage for application to the alternator main exciter field winding in response to the voltage induced in said first winding by said changing magnetic field;

a second winding within said changing magnetic field; and a second voltage regulator coupled to said second winding and operable to develop a desired voltage for application to the starting battery of the engine-driven generator in response to the voltage induced in said second winding by said changing magnetic field.

7. A battery charger/pre-exciter as defined in claim 6 wherein said means for rotating said permanent magnet comprises a rotatable shaft couplable to the engine of the engine-driven generator.

8. A battery charger/pre-exciter as defined in claim 7 wherein said battery charger/pre-exciter includes a plurality of said permanent magnets.

9. A battery charger/pre-exciter as defined in claim 7 wherein said desired voltage developed by said second voltage regulator comprises a substantially constant voltage that is substantially independent of the current supplied by the engine-driven generator.

10. An alternator comprising:

an input shaft;

a main alternator field winding co-rotatable with said input shaft;

a main alternator output winding in magnetic communication with said main alternator field winding;

a main exciter field winding;

a main exciter armature winding co-rotatable with said input shaft in magnetic communication with said main exciter field winding and electrically coupled to said main alternator field winding;

a plurality of permanent magnets co-rotatable with said input shaft for developing a changing magnetic field in response to rotation of said input shaft;

a pre-exciter winding in magnetic communication with said permanent magnets;

means for coupling electrical energy developed in said pre-exciter winding to said main exciter field winding;

a battery charge winding;

said main alternator output winding, said main exciter field winding, said pre-exciter winding and said battery charge winding each being stationary relative to said input shaft; and voltage regulator means coupled to said battery charge winding for converting electrical energy induced in said battery charge winding to a direct current suitable for charging a battery.

11. An alternator as defined in claim 10 wherein said means for coupling electrical energy includes a rectifier for converting alternating current energy developed in said main exciter armature winding to a unidirectional current for application to said main alternator field winding.

12. An alternator as defined in claim 11 wherein said main exciter armature winding comprises a three-phase winding and said rectifier comprises a three-phase rectifier.

13. An alternator as defined in claim 11 wherein said main alternator output winding comprises a three-phase winding.

14. An alternator as defined in claim 10 wherein said desired direct current output provided by said voltage regulator means is maintained at a substantially constant voltage substantially independently of the rotational speed of said input shaft.

\* \* \* \* \*